United States Patent
Sharma

(10) Patent No.: US 11,192,308 B2
(45) Date of Patent: Dec. 7, 2021

(54) PRINTER FILAMENT FEED MONITORING

(71) Applicant: INTERNATIONAL BUSINESS MACHINES CORPORATION, Armonk, NY (US)

(72) Inventor: Deepak Sharma, Sahibabad (IN)

(73) Assignee: International Business Machines Corporation, Armonk, NY (US)

(*) Notice: Subject to any disclaimer, the term of this patent is extended or adjusted under 35 U.S.C. 154(b) by 624 days.

(21) Appl. No.: 15/923,260

(22) Filed: Mar. 16, 2018

(65) Prior Publication Data
US 2019/0283330 A1    Sep. 19, 2019

(51) Int. Cl.
| | |
|---|---|
| *B29C 64/393* | (2017.01) |
| *B33Y 50/02* | (2015.01) |
| *B29C 64/118* | (2017.01) |
| *B29C 64/321* | (2017.01) |
| *B65H 51/04* | (2006.01) |
| *B65H 63/00* | (2006.01) |
| *B33Y 30/00* | (2015.01) |
| *B33Y 10/00* | (2015.01) |

(52) U.S. Cl.
CPC .......... *B29C 64/393* (2017.08); *B29C 64/118* (2017.08); *B29C 64/321* (2017.08); *B33Y 50/02* (2014.12); *B65H 51/04* (2013.01); *B65H 63/00* (2013.01); *B33Y 10/00* (2014.12); *B33Y 30/00* (2014.12)

(58) Field of Classification Search
CPC ... B29C 64/393; B29C 64/118; B29C 64/321; B33Y 50/02; B33Y 30/00; B33Y 10/00; B65H 51/04; B65H 63/00
See application file for complete search history.

(56) References Cited

U.S. PATENT DOCUMENTS

| | | |
|---|---|---|
| 9,238,331 B2 | 1/2016 | Schmehl |
| 2013/0164960 A1 | 6/2013 | Swanson |
| 2015/0209978 A1 | 7/2015 | Snyder |
| 2016/0052208 A1 | 2/2016 | Debora |
| 2016/0332383 A1 | 11/2016 | Sanchez et al. |

(Continued)

FOREIGN PATENT DOCUMENTS

| | | |
|---|---|---|
| CN | 103640222 A | 3/2014 |
| CN | 204658969 U | 9/2015 |

(Continued)

OTHER PUBLICATIONS

European Office Action of European Application No. 19 709 659.7-1017, dated Mar. 12, 2021.

(Continued)

*Primary Examiner* — Robert J Grun
(74) *Attorney, Agent, or Firm* — L. Jeffrey Kelly

(57) ABSTRACT

A filament feed monitor and method of remediating a printing error in a 3D printer is provided. The method may include detecting motion of a trailing gear by an optical sensor. The printing error may be detected by a controller connected to the optical sensor in response to a determination that rotational motion of a filament feed roller has exceeded a predetermined threshold, which may be determined based on the detected motion of the trailing gear. A command may be generated and executed by the controller to remediate the printing error.

10 Claims, 4 Drawing Sheets

(56) References Cited

U.S. PATENT DOCUMENTS

| | | | |
|---|---|---|---|
| 2017/0066130 A1* | 3/2017 | Corkum | ................ B25J 9/1651 |
| 2017/0217013 A1 | 8/2017 | Iqtidar | |
| 2018/0043628 A1* | 2/2018 | Nadeau | ................ B29C 64/118 |

FOREIGN PATENT DOCUMENTS

| | | | |
|---|---|---|---|
| CN | 205075345 U | 3/2016 | |
| CN | 105922600 A | 9/2016 | |
| CN | 106079449 A | 11/2016 | |
| CN | 107206672 A | 9/2017 | |
| CN | 107322921 A | 11/2017 | |
| DE | 102017100170I A | 2/2018 | |
| EP | 3238914 A1 | 11/2017 | |
| KR | 20170096357 A | 8/2017 | |
| TW | 201725108 A | 7/2017 | |
| WO | 2015027938 A1 | 3/2015 | |
| WO | 2016082036 A1 | 6/2016 | |
| WO | 2017088754 A1 | 6/2017 | |
| WO | 2019174935 A1 | 9/2019 | |

OTHER PUBLICATIONS

Notification of Transmittal of the International Search Report and the Written Opinion of the International Searching Authority, or the Declaration, dated Jun. 13, 2019, Applicant's or agent's file reference IN820161409, International application No. PCT/EP2019/055174, 15 pages.

CN Office Action, Application No. 201980018321.5, dated Sep. 16, 2021, 18 pages.

* cited by examiner

PRINTER FILAMENT FEED MONITORING

BACKGROUND

The present invention relates generally to the field of additive manufacturing, and in particular to material handling and regulation in fused filament fabrication.

SUMMARY

Aspects of the present invention are directed to a filament feed monitor and method of remediating a printing error in a 3D printer. In various aspects, the method may include detecting motion of a trailing gear by an optical sensor. The printing error may be detected by a controller connected to the optical sensor in response to a determination that rotational motion of a filament feed roller has exceeded or fallen below a predetermined threshold, which may be determined based on the detected motion of the trailing gear. A command may be generated and executed by the controller to remediate the printing error.

In an aspect, the method may include determining that a printing mode of the 3D printer comprises extrusion. A filament feed condition may be determined based on the detected motion of the trailing gear.

In an aspect, the filament feed condition may include filament feed motion and filament feed rate.

In an aspect, an instance of filament absence in a filament extruder may be detected based on the determined filament feed condition.

In an aspect, an instance of nozzle clogging in a filament extruder may be detected based on the determined filament feed condition.

In an aspect, the motion of the trailing gear may correspond to the motion of the filament feed roller and the motion of the filament feed roller may be transmitted to the trailing gear by way of a gear train interconnected to the filament feed roller and the trailing gear.

In an aspect, the gear train may be interconnected to the filament feed roller by a leading gear, wherein the gear train may include an intermediate gear engaged to the leading gear and the trailing gear.

In various aspects, the command may be executed to pause printing, to heat a hot end of an extruder, or to control a drive rate of a drive motor and motion of a tool head based on the determined filament feed condition, wherein the rotational motion of the filament feed roller may be driven by the drive motor.

In various aspects, a printing error may be detected based on a determination that the rotational motion has changed in direction. The printing error may alternatively be detected based on a determination that the rotational motion has ceased.

In an aspect, the filament feed monitor may include a filament feed roller, a gear train including a leading gear and a trailing gear, wherein the gear train may be coupled to the filament feed roller by the leading gear, and an optical sensor directed towards a sensor-facing surface of the trailing gear, wherein the optical sensor may be connected to a controller for communication. The leading gear may be coupled to the filament feed roller to receive rotational motion for amplification at the trailing gear by transmission through the gear train. The 3D printer may include a drive motor for driving the rotational motion of the filament feed roller. The optical sensor may detect motion of the sensor-facing surface, wherein the controller may be connected to the drive motor to control the rotational motion of the filament feed roller based on the detected motion of the sensor-facing surface.

BRIEF DESCRIPTION OF THE DRAWINGS

The following detailed description, given by way of example and not intended to limit the invention solely thereto, will best be appreciated in conjunction with the accompanying Figures. The Figures are not necessarily to scale. The Figures are merely schematic representations, not intended to portray specific parameters of the invention. The Figures are intended to depict only typical embodiments of the invention. In the Figures, like numbering represents like elements.

DETAILED DESCRIPTION

Figure 1:
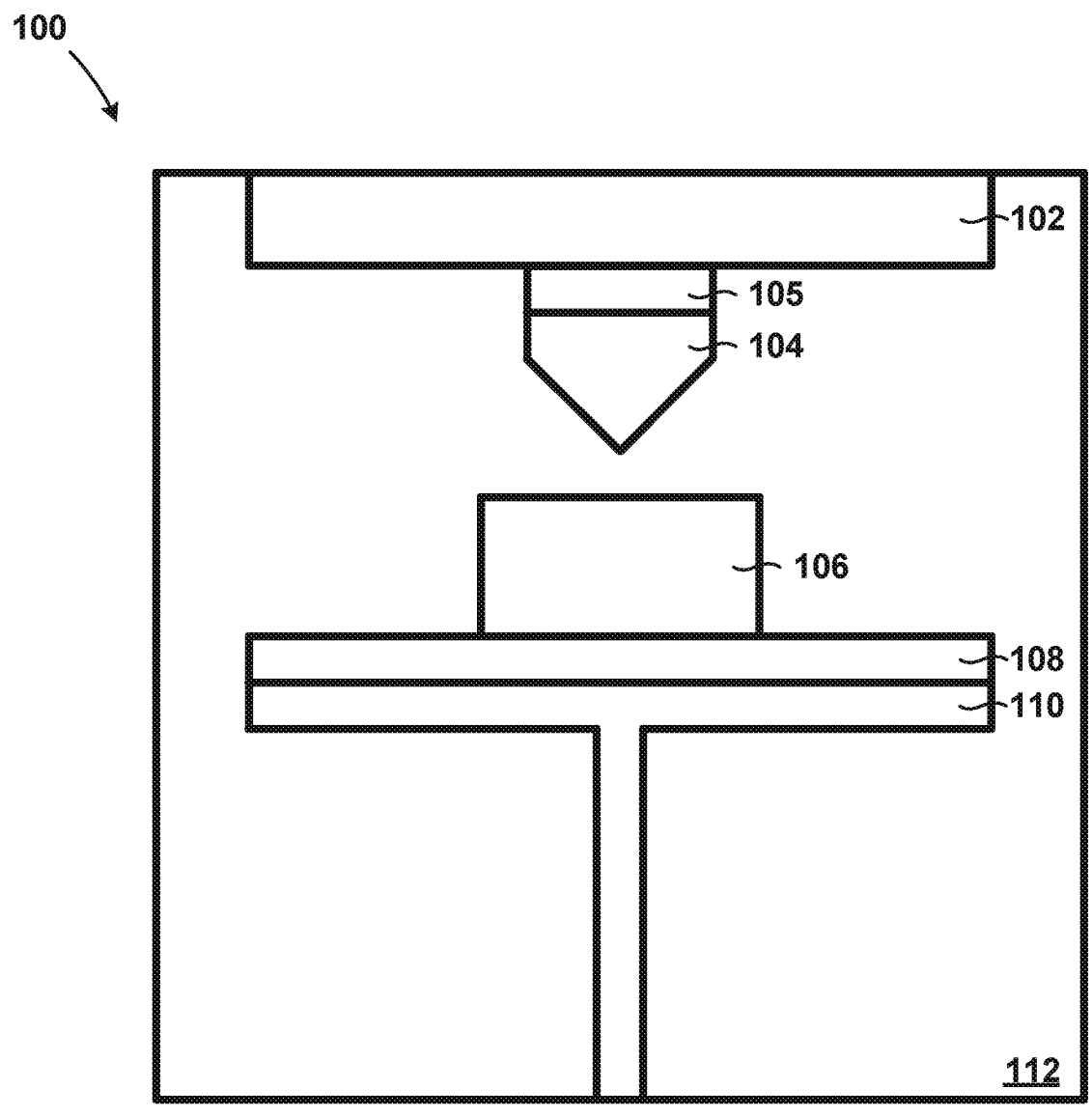
FIG. 1 depicts a cross-sectional view of a portion of a printer during an intermediate step of a method of printing, in accordance with an embodiment of the present invention.
Figure 1:
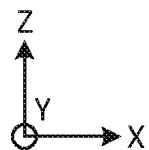

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, the practical application or technical improvement over technologies found in the marketplace, or to enable others of ordinary skill in the art to understand the embodiments disclosed herein. As described, details of well-known features and techniques may be omitted to avoid unnecessarily obscuring the embodiments of the present invention.

References in the specification to "one embodiment", "an embodiment", "an example embodiment", or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to effect such one or more features, structures, or characteristics in connection with other embodiments, where applicable, whether or not explicitly described.

For purposes of the description hereinafter, the terms "upper," "lower," "right," "left," "vertical," "horizontal," "top," "bottom," "perpendicular," "parallel," and the like, and any derivatives thereof, shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary layers at the interface of the two elements.

In the interest of not obscuring disclosure of embodiments of the present invention, the following detailed description may contain certain processing steps or operations that are known in the art which may have been combined for purposes of clear description and illustration. In some instances, certain processing steps or operations that are known in the art may not be described in detail and/or may not be described at all. It shall be understood that the following disclosure of embodiments of the present invention is relatively focused on distinctive elements, features, structures, or characteristics thereof.

Fused filament fabrication, also known as fused deposition modeling, is an additive manufacturing process in which molten material is extruded for layered deposition in printing or building a three-dimensional (3D) object. The process may be implemented, for example, by a 3D printer in rapid prototyping or manufacturing. The printer may include a tool- or print-head including an extrusion assembly having a nozzle for extrusion of the material. The material may include, for example, a thermoplastic filament, which may be supplied from a spool or reel and loaded into the print-head at a feed rate by a filament feed mechanism. The filament may be heated in the extrusion assembly for extrusion through an outlet of the nozzle.

Under certain operating conditions, printer malfunction or error may occur due to, for example, nozzle clogging or improper filament feeding, often causing incomplete or defective objects to be printed. For example, under certain operating conditions, improper filament feeding may be caused by improper heating of a hot end of the extrusion assembly, which may prematurely liquefy the filament in the assembly and result in increasing back pressure that can lead to printer malfunction. Under other operating conditions, for example, nozzle clogging may be caused by the improper heating of the hot end, which may solidify previously liquefied filament about the outlet of the nozzle and result in a clog that can lead to printer malfunction. The nozzle clogging may otherwise or additionally be caused by improper heating of the hot end, causing insufficient heating of the filament such as to a particular melting point or temperature, leading to a failure to liquefy the filament. In another example, improper filament feeding may be caused by inconsistencies in filament diameter. In other examples, nozzle clogging may be caused by filament impurities or contaminants, filament interactions with foreign filament residues such as may be left in the assembly from other filaments, excessive filament moisture such as may be absorbed by certain types of thermoplastic filaments from the environment, and the like.

Such printer malfunctions may occur undetected during printer operation due to inadequate filament feed motion tracking or monitoring. For example, in a conventional 3D printer, a filament counter or metering device may include an incremental rotary encoder that may be implemented in filament feed motion monitoring. A motion measurement resolution of the encoder may be insufficient to effectively detect the malfunctions, given the relatively low speed or feed rate at which a filament may travel or be loaded into the print-head during printer operation. Such insufficiency may cause excessively long detection response times by the filament counter device and thereby contribute to the failure to detect the printer malfunctions during operation.

Embodiments of the present invention are directed to an apparatus and method for monitoring filament feed motion and filament feed rate in a 3D printer during printer operation to detect improper filament feeding and prevent printing error. The apparatus may include a filament motion sensor assembly having an optical sensor and a gear train. In an aspect, the apparatus and method may be implemented to detect instances of extrusion nozzle clogging and improper filament feeding during printer operation to prevent incomplete or defective object printing. The gear train may be arranged to interface a filament feed roller of a filament feed mechanism of the printer. The gear train may include a leading gear for interconnection to the filament feed roller, for transmission and amplification of rotational motion of the roller through the gear train to a trailing gear for measurement by the optical sensor. The amplified rotational motion may be provided for measurement by way of a sensor-facing surface of the trailing gear.

Advantageously, the apparatus and method according to the present invention may be economically implemented in a 3D printer to provide improved filament feed monitoring during printer operation. In an aspect, the filament feed monitoring may provide high motion measurement resolution sufficient for effectively detecting printing errors with minimal error detection response time, as such errors may be caused by extrusion nozzle clogging or improper filament feeding. The error detection response time may be minimized by effectively continuous, as opposed to incremental, filament feed motion tracking as provided by the present invention. To that end, embodiments of the present invention may be implemented to improve operational efficiency, reliability, and throughput, and to reduce the potential of waste caused by incomplete or defective object printing.

FIG. 1 depicts a cross-sectional view of a portion of printer 100 during an intermediate step of a method of printing, in accordance with an embodiment of the present invention. Printer 100 may include tool stage 102 interconnected to tool head 104, print bed 108 interconnected to print stage 110, interior 112, and filament motion sensor assembly 105.

Printer 100 represents an automated manufacturing apparatus. In an embodiment of the present invention, printer 100 may include, for example, a 3D printer. In the embodiment, printer 100 may implement, for example, an additive manufacturing process such as a fused filament fabrication process in printing item 106. Tool head 104 may be spatially arranged above print bed 108 within interior 112, as depicted in FIG. 1. Item 106 may be 3D-printed part, item, or object. Item 106 may be printed on or along a surface of print bed 108, which may face tool head 104 during printer operation, as depicted in FIG. 1. Printer 100 may implement a spatial orientation and positioning system to control spatial orientation and positioning of tool head 104 by way of tool stage 102, print bed 108 by way of print stage 110, or both, during printer operation. The spatial orientation and positioning system may include, for example, a controller, instrumentation, actuators such as drives and motors, and the like. Spatial orientation and positioning of tool head 104, print bed 108, or both, may be implemented with respect to one or more perpendicularly oriented axes such as the X-, Y-, and Z-axes of a three-dimensional Cartesian coordinate system, as depicted in FIG. 1.

In various embodiments of the present invention, printer 100 may include, for example, a delta-coordinate 3D printer, a polar-coordinate 3D printer, and a robotic-arm type 3D printer.

Tool stage 102 represents part of the spatial orientation and positioning system of printer 100. In an embodiment of the present invention, tool stage 102 may support tool head 104 for spatial orientation and positioning within interior 112 during printer operation. Tool stage 102 may include, for example, a mount or carriage for supporting tool head 104. The mount may be attached to, for example, a motorized X-Y stage, a motorized Z-axis stage, and the like, for movement with tool head 104 along or about the X-, Y-, and Z-axes, as depicted in FIG. 1.

Tool head 104 represents an extrusion assembly that may be implemented in the fused filament fabrication process performed by printer 100 during operation. In an embodiment of the present invention, tool head 104 may include, for example, a filament feed mechanism and an extrusion nozzle. In the embodiment, the filament feed mechanism may include, for example, a drive motor such as a stepper motor or brushless direct-current (DC) electric motor, a drive controller such as a drive circuit or microcontroller, and a filament feed roller such as a pinch wheel or roller. The drive motor may be interconnected to the filament feed roller and may be controlled by the drive controller to drive or actuate the filament feed roller during operation. In the embodiment, the extrusion nozzle may include, for example, an inlet, a heating element such as a liquefier, and an outlet. In the embodiment, filament may be, for example, drawn and supplied from a spool or reel during printer operation and loaded into tool head 104 at a feed rate by way of the filament feed mechanism, for feeding into the extrusion nozzle by way of the inlet, heating by way of the heating element, and subsequent extrusion through the outlet of the nozzle. Extruded filament may be formed and deposited in layers on or along a surface of print bed 108 in printing item 106. In the embodiment, the filament may include, for example, a thermoplastic filament. The thermoplastic filament may be of materials such as acrylonitrile butadiene styrene (ABS), polylactic acid (PLA), polyphenylsulfone (PPSF), polycarbonate (PC), and the like. The spool may be attached to a frame of printer 100.

Print bed 108 represents a build surface upon which the extruded filament may be deposited for support in printing item 106. In an embodiment of the present invention, print bed 108 may include, for example, a print bed, a build plate, a print sheet, and the like. A surface of print bed 108 facing tool head 104 may receive the extruded filament during printer operation.

Print stage 110 represents part of the spatial orientation and positioning system of printer 100. In an embodiment of the present invention, print stage 110 may support print bed 108 for spatial orientation and positioning within interior 112 during printer operation. Print stage 110 may include, for example, a mount or surface for supporting print bed 108. The mount may interface with, for example, a motorized X-Y stage, a motorized Z-axis stage, and the like, for movement with print bed 108 and item 106 along or about the X-, Y-, and Z-axes, as depicted in FIG. 1.

Figure 2A:
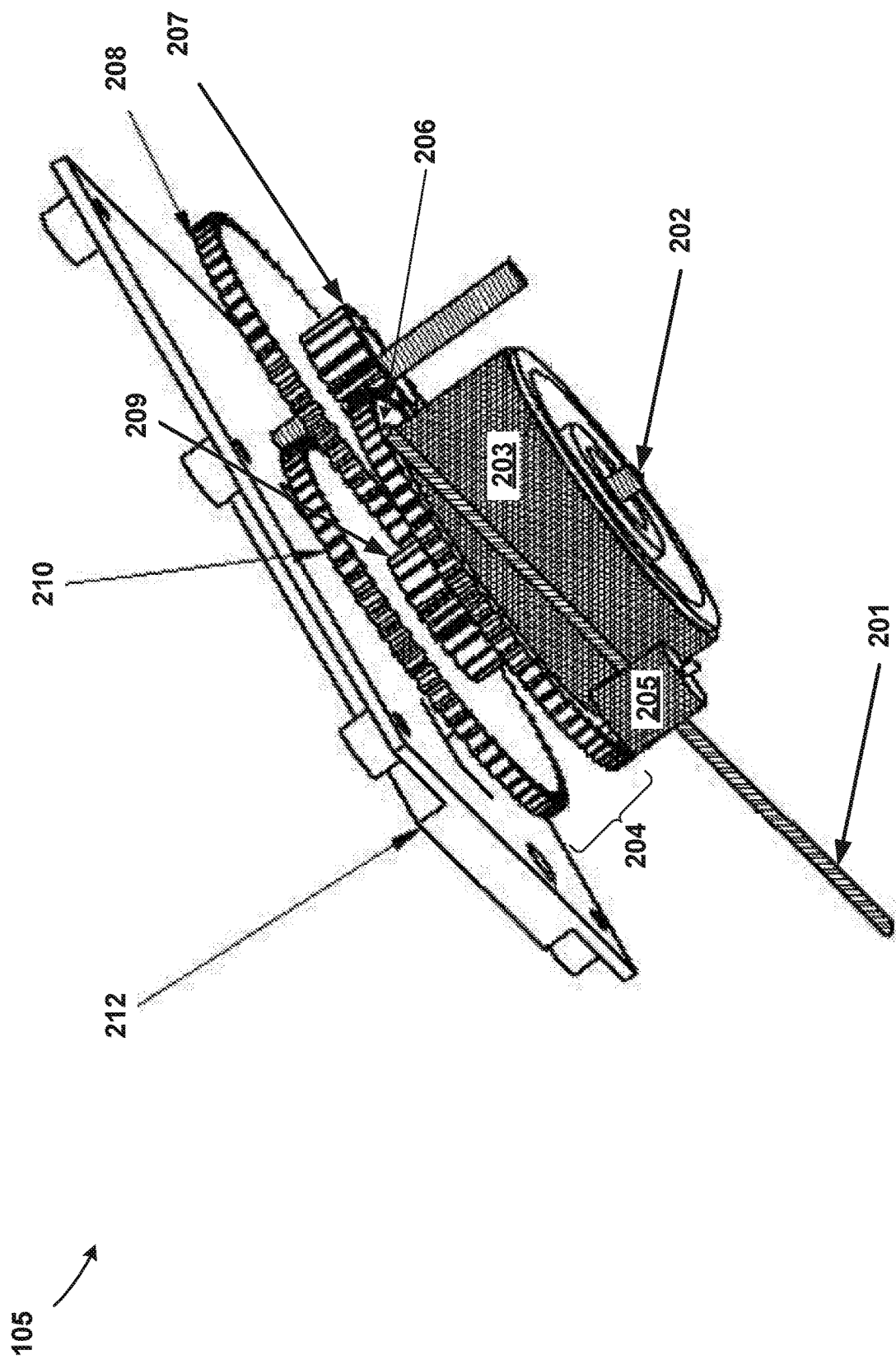
FIGS. 2A and 2B depict first and second views, respectively, of a filament motion sensor assembly, in accordance with an embodiment of the present invention.
Figure 2B:
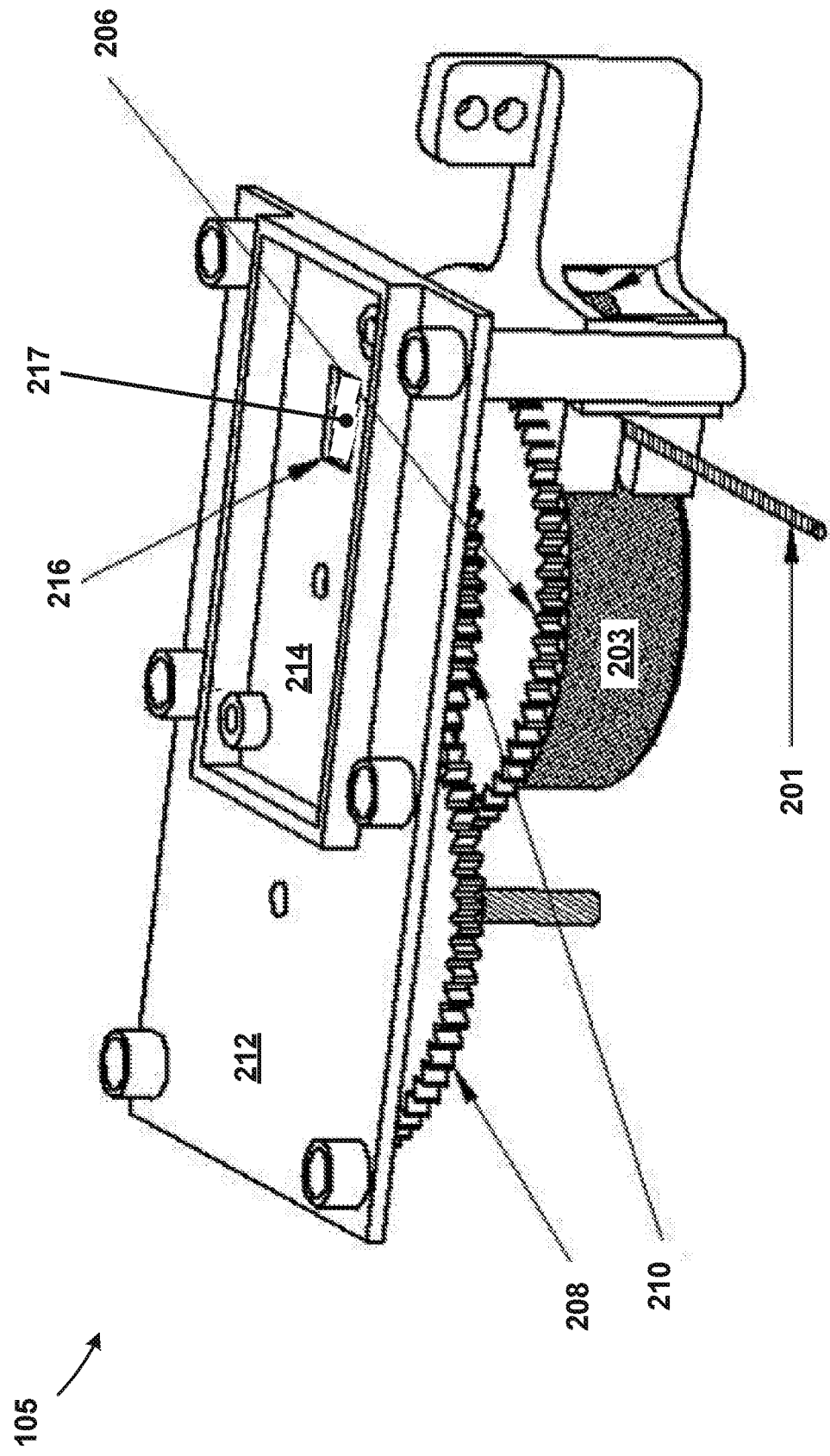

FIGS. 2A and 2B depict first and second views, respectively, of filament motion sensor assembly 105, in accordance with an embodiment of the present invention. Filament motion sensor assembly 105 may include optical sensor 212 and gear train 204.

Filament motion sensor assembly 105 provides functionality to printer 100 such as may be provided by a filament feed monitor, a filament counter, a filament feed rate tracker, or the like. In an embodiment of the present invention, filament motion sensor assembly 105 may be implemented with respect to tool head 104 to monitor filament feed motion and filament feed rate in printer 100 during printer operation. In the embodiment, filament motion sensor assembly 105 may be implemented to detect instances of extrusion nozzle clogging and improper filament feeding of filament 201 during printer operation with respect to tool head 104 to prevent incomplete or defective object printing by printer 100.

With reference to FIG. 2A, filament motion sensor assembly 105 may be implemented with respect to filament feed roller 203 of tool head 104. Filament feed roller 203 may operate in conjunction with an adjacent idler wheel 205. During printer operation, filament feed roller 203 may be driven for rotation about axis 202 in a filament-feeding direction to enable feeding of filament such as filament 201 at a feed rate into the extrusion nozzle of tool head 104, as described with reference to FIG. 1. Filament feed roller 203 may otherwise be driven in a reverse direction to enable retraction of filament 201. In the embodiment, the feed rate of filament 201 may correspond to a tangential velocity of filament feed roller 203. For example, a peripheral or tangential speed of a point located about a circumference of filament feed roller 203 may be, for example, approximately 0.2 millimeters per second; therefore, the feed rate of filament 201 may be approximately 0.2 millimeters per second, accordingly. Generally, the feed rate may vary based on, for example, material properties of filament 201, required material properties of item 106 upon completion of printing, and the like.

In an embodiment of the present invention, gear train 204 may be arranged to interface with and be driven by filament feed roller 203. In the embodiment, gear train 204 may include, for example, input or leading gear 206, intermediate gear 208, and output or trailing gear 210. In the embodiment, leading gear 206 may be, for example, interconnected to filament feed roller 203 for corresponding rotation therewith, to transmit rotational motion of filament feed roller 203 to intermediate gear 208 and trailing gear 210. In the embodiment, leading gear 206 may otherwise be, for example, connected with filament feed roller 203 for corresponding rotation during printer operation. In the embodiment, leading gear 206 may mesh with intermediate gear 208, which may in turn mesh with trailing gear 210. In the embodiment, the rotational motion input to gear train 204 at leading gear 206 may be transmitted and amplified for output at trailing gear 210, for measurement by optical sensor 212. In the embodiment, the amplified rotational motion of filament feed roller 203 may be provided for measurement, for example, by way of sensor-facing surface 217 of trailing gear 210, as depicted in FIG. 2B.

In an embodiment of the present invention, leading gear 206 may include, for example, a spur gear. In the embodiment, intermediate gear 208 and trailing gear 210 may each include, for example, a compound spur gear. The compound spur gear may include, for example, two coupled and coaxially arranged spur gears. The coupled and coaxially arranged spur gears may be different sizes. In the embodiment, intermediate gear 208 and trailing gear 210 may include, for example, coaxially arranged spur gear 207 and coaxially arranged spur gear 209, respectively. In the embodiment, leading gear 206, intermediate gear 208, and trailing gear 210 may rotate about parallel axes. In the embodiment, leading gear 206, intermediate gear 208, and trailing gear 210 may otherwise include any other type of gear, depending on an arrangement of rotational axes of each of the gears, accordingly.

Rotational motion input to and transmitted through gear train 204 by filament feed roller 203 may be amplified in accordance with an overall gear ratio, or speed ratio, of gear train 204. In an embodiment of the present invention, the speed ratio of gear train 204 may be specified based on a first ratio, defined, for example, based on a radius of leading gear 206 with respect to a radius of filament feed roller 203. In an example, the first ratio may be 1.3 to 1; that is, the radius of leading gear 206 may be 1.3 times the radius of filament feed roller 203. In the embodiment, the gear ratio of gear train 204 may further be specified based on a second ratio, defined, for example, based on a radius of intermediate gear 208 with respect to a radius of coaxially arranged spur gear 207. In the example, the second ratio may be 3.2 to 1; that is, the radius of intermediate gear 208 may be 3.2 times the radius of coaxially arranged spur gear 207. In the embodiment, the gear ratio of gear train 204 may further be specified based on a third ratio, defined, for example, based on a radius of trailing gear 210 with respect to a radius of coaxially arranged spur gear 209. In the example, the second ratio may be 3.2 to 1; that is, the radius of trailing gear 210 may be 3.2 times the radius of coaxially arranged spur gear 209. In the embodiment, the second and third ratios may be equal. In the embodiment, the speed ratio of gear train 204 may be, for example, approximately 13.3. In the example, such may be computed as the product of the first ratio, the second, ratio, and the third ratio; that is, 1.3 times 3.2 times 3.2, equaling approximately 13.3. Where the feed rate of filament 201 may be equal to approximately 0.2 millimeters per second, such as in the previous example, this results in a tangential speed at a point located about a circumference of trailing gear 210 of approximately 2.66 millimeters per second. Gear train 204 may otherwise be designed to include a different number of gears such as leading gear 206, intermediate gear 208, or trailing gear 210, resulting in a different gear or speed ratio, which may be determined as a matter of design.

With reference to FIG. 2B, optical sensor 212 may be implemented with respect to sensor-facing surface 217 of trailing gear 210, in order to monitor filament feed motion and filament feed rate of filament 201 to detect the instances of extrusion nozzle clogging and improper filament feeding during printer operation. In an embodiment of the present invention, the instances of extrusion nozzle clogging and improper filament feeding may be detected based on relative rotational motion of sensor-facing surface 217 of trailing gear 210. In the embodiment, the relative rotational motion may include, for example, variations of the amplified rotational motion of filament feed roller 203 output by trailing gear 210. For example, the variations may include reversals in direction of rotational motion, increasing or decreasing rates of rotational motion, or a lack of rotational motion. In the embodiment, optical sensor 212 may be positioned adjacent to sensor-facing surface 217 of trailing gear 210. In the embodiment, optical sensor 212 may include, for example, sensor housing 214 and sensor interface 216. In the embodiment, sensor housing 214 may include, for example, an optical sensor and an optical error detection controller.

In an embodiment of the present invention, the optical sensor may be implemented to generate data for monitoring the filament feed motion and filament feed rate of filament 201. In the embodiment, the generated data for monitoring the filament feed motion and filament feed rate may include, for example, rotational motion data corresponding to the amplified rotational motion of filament feed roller 203. In the embodiment, the optical sensor may include, for example, a light source, a light detector, and an optical sensor controller. In the embodiment, the light source may include, for example, a light-emitting diode (LED), a light amplification by stimulated emission of radiation (laser) light source, or the like. For example, the light source may include an infrared diode, an infrared laser, or a laser diode. In the embodiment, the light detector may include, for example, a camera, an image sensor, an optical sensor, a photodetector, a photoelectric cell, or the like. For example, the light detector may include a complementary metal-oxide-semiconductor (CMOS) image sensor. In the embodiment, the optical sensor controller may include, for example, an integrated circuit. For example, the optical sensor controller may include an image processing chip, a digital signal processing (DSP) chip, or the like. In the embodiment, the optical sensor may include and be implemented by, for example, an optical mouse sensor. In an example, the optical sensor may be implemented by an optical mouse sensor such as the PAW3204 mouse sensor, developed by PixArt Imaging, Inc. of Hsin-Chu, Taiwan. In the embodiment, the optical sensor may include, for example, a resolution of 800 dots per inch (DPI). Generally, the optical sensor may be chosen as a matter of design, such as based on magnitudes of the variations of the amplified rotational motion of filament feed roller 203 output by trailing gear 210.

In an embodiment of the present invention, the optical error detection controller may be implemented to communicate with the optical sensor in order to monitor the filament feed motion and filament feed rate of filament 201, to detect the instances of extrusion nozzle clogging and improper filament feeding during printer operation. In the embodiment, the optical error detection controller may communicate with the optical sensor by way of a two-wire link communication protocol, a half-duplex communication protocol, or the like. In the embodiment, the optical error detection controller may further be implemented to communicate with the drive controller of the filament feed mechanism of tool head 104, in order to control optical sensor 212 or the actuation of filament feed roller 203 by the drive motor. In the embodiment, the optical error detection controller may include, for example, a microcontroller. For example, the optical error detection controller may include a central processing unit, memory, and programmable input/output (I/O) peripherals. In an example, the optical error detection controller may be implemented by a microcontroller such as the "Atmega 16" CMOS 8-bit microcontroller, developed by Atmel Corporation of San Jose, Calif.

In an embodiment of the present invention, the optical error detection controller may further be implemented to communicate with drive motors connected to tool head 104 in order to control motion and velocity of tool head 104.

In an embodiment of the present invention, sensor interface 216 may be implemented to provide an interface between the optical sensor of sensor housing 214 and sensor-facing surface 217 of trailing gear 210. In the embodiment, sensor interface 216 may include, for example, a hole, aperture, window, or the like.

Figure 3:
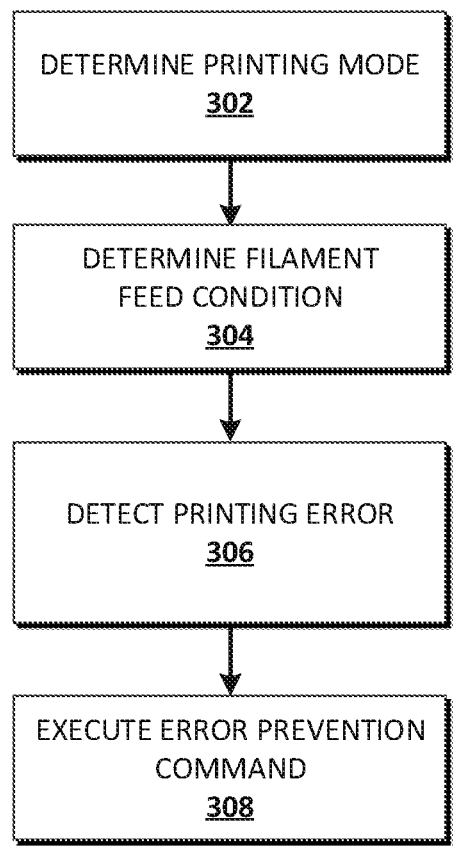
FIG. 3 depicts a flowchart of operational steps of the filament motion sensor assembly during an intermediate step of a method of printing, in accordance with an embodiment of the present invention.

FIG. 3 depicts a flowchart of operational steps of filament motion sensor assembly 105 during an intermediate step of a method of printing, in accordance with an embodiment of the present invention.

At step 302, filament motion sensor assembly 105 may determine a current printing mode of printer 100. In an embodiment of the present invention, the printing mode may include, for example, an extruding mode and a travel mode. In the embodiment, the extruding mode may correspond to a retract enabled mode, and the travel mode may correspond to a retract disabled mode. The extruding mode may include, for example, a mode in which filament 201 may be drawn and supplied from the spool of printer 100 during printer operation and loaded into tool head 104 at a feed rate by way of the filament feed mechanism, for feeding into the extrusion nozzle by way of the inlet, heating by way of the heating element, and subsequent extrusion through the outlet of the nozzle. The travel mode may include, for example, a mode in which tool head 104 may not be drawn and supplied from the spool of printer 100 during printer operation, such as during travel of tool head 104 between printing points or areas with respect to item 106. During the travel mode, filament 201 may not be loaded or fed into tool head 104. In the travel mode, filament 201 may be retracted a predetermined distance, such as approximately 1 mm, by reverse driving of the drive motor, and reverse actuation of filament feed roller 203, accordingly.

In an embodiment of the present invention, the printing mode of printer 100 may be determined, for example, based on data received by the optical error detection controller of optical sensor 212, from the drive controller of the filament feed mechanism of tool head 104. In the embodiment, the received data may include, for example, step and directional inputs generated by the drive controller of tool head 104 in actuating the drive motor of the filament feed mechanism to drive filament feed roller 203. In the embodiment, the retraction may correspond, for example, to an associated amplified rotational motion of filament feed roller 203.

At step 304, filament motion sensor assembly 105 may determine a filament feed condition with respect to filament 201. In an embodiment of the present invention, the filament feed condition may be based on filament feed motion and filament feed rate, which may be monitored in response to a determination that a current printing mode of printer 100 includes the extruding mode. In the embodiment, the filament feed condition may be determined based on filament motion data, which may be generated by optical sensor 212 based on the rotational motion of sensor-facing surface 217. In the embodiment, the optical error detection controller of optical sensor 212 may receive the filament motion data to monitor the filament feed motion and filament feed rate of filament 201.

In an embodiment of the present invention, the filament motion data may include, for example, X- and Y-directional movement data, as generated by optical sensor 212 in tracking the rotational motion of sensor-facing surface 217. In the embodiment, the rotational motion of filament feed roller 203 may be determined based on the X- and Y-directional movement data. In the embodiment, a measurement resolution provided by filament motion sensor assembly 105 may be determined and adjusted, for example, based on a distance of sensor interface 216 from a rotational axis (not depicted) of trailing gear 210. For example, the distance may be reduced to provide higher measurement resolution in terms of revolutions per second of sensor-facing surface 217. The measurement resolution provided by filament motion sensor assembly 105 may be chosen based on the amplified rotational motion of filament feed roller 203, as provided at sensor-facing surface 217, and the rotational motion of filament feed roller 203.

At step 306, filament motion sensor assembly 105 may detect a printing error. In an embodiment of the present invention, printing errors may include, for example, filament feed motion and filament feed rate errors, which may be caused by or lead to partial or complete nozzle clogging, filament absence, and the like. In the embodiment, the printing error may be detected, for example, based on the filament motion data with respect to a determined printing mode, such as at step 302. In the embodiment, the printing error may be detected in response to a determination that printer 100 has been set to an extrusion mode. In the embodiment, the printing error may be detected in response to a determination that the amplified rotational motion of filament feed roller 203, at sensor-facing surface 217, has risen above or fallen below a predetermined threshold. The predetermined threshold may be determined based on normal rotational motion of filament feed roller 203 during the extrusion mode. For example, excessively high rotational motion or a lack of the rotational motion may be indicative of filament absence, and excessively low rotational motion may be indicative of nozzle clogging. In the embodiment, the printing error may be detected in response to a determination that a rate of change of the amplified rotational motion of filament feed roller 203 has risen above or fallen below a predetermined threshold. For example, where a stepper motor is used to drive filament feed roller 203 for rotation about axis 202, nozzle clogging may result in intermittent drive motor skipping, (i.e., accelerations in the amplified rotation motion of filament feed roller 203).

At step 308, filament motion sensor assembly 105 may generate a command for execution based on a detected printing error. In an embodiment of the present invention, the command may be generated by the optical error detection controller of optical sensor 212. In the embodiment, the command may be communicated to the drive controller of the filament feed mechanism of tool head 104 for execution. In the embodiment, the command may be executed to pause printing during printer operation. In the embodiment, the command may additionally be executed to communicate an alert, such as to a user interface of printer 100. In the embodiment, the command may additionally be executed to communicate an alert to a user device, such as over a network such as an intranet, a local area network (LAN), a personal area network (PAN), a wireless local area network (WLAN), a wireless personal area network (WPAN), a wide area network (WAN) such as the Internet, or the like. Generally, the command may be generated in order to prevent incomplete or defective object printing.

In an embodiment of the present invention, the command may be executed to modulate or enable heating of the hot end of tool head 104. For example, the hot end may be heated to a predetermined temperature to ensure properly liquefied filament at the hot end. The hot end may be heated, for example, in response to a determination that the rotational motion has fallen below a predetermined threshold. Rotational motion below the predetermined threshold may indicate, for example, nozzle clogging. In the embodiment, in response to a determination that the rotational motion has risen above a predetermined threshold, the hot end may be heated to a predetermined temperature to ensure properly liquefied filament at the hot end. Rotational motion above the predetermined threshold may indicate, for example, filament absence.

In an embodiment of the present invention, the command may be executed to control a drive rate of the drive motor based on the filament feed condition. In the embodiment, the command may further be executed to control motion of tool head 104 based on the filament feed condition. For example, the command may be executed to reduce filament feed rate and motion (i.e., velocity) of tool head 104 to account for changes to extrusion rate that may occur as a result of the reduced filament feed rate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

What is claimed is:

1. A filament feed monitor assembly for a 3D printer, comprising:
   a feed roller rotatable about a first axis;
   a leading gear coupled to the feed roller such that the feed roller and the leading gear rotate together at a first speed;
   a first compound gear comprising an intermediate gear and a first spur gear, the first compound gear rotatable about a second axis at a second speed, the first spur gear is meshed with the leading gear such that the first spur gear and the leading gear rotate in opposite directions;
   a second compound gear comprising a trailing gear and a second spur gear, the second compound gear rotatable about the first axis at a third speed, the second spur gear is meshed with the intermediate gear such that the second spur gear and the intermediate gear rotate in opposite directions, and the leading gear and the trailing gear rotate in the same direction; and
   an optical motion sensor electrically coupled to an optical error detection controller and used to detect the third speed.

2. The assembly of claim 1, further comprising:
   a drive motor controlled by a drive controller based on input received from the optical error detection controller.

3. The assembly of claim 1, further comprising:
   a housing in which the optical motion sensor is secured, wherein both the first axis and the second axis perpendicularly extend from the housing in a direction parallel to a sensing direction of the optical motion sensor.

4. The assembly of claim 1,
   wherein a diameter of the leading gear is 1.3 times a diameter of the feed roller,
   wherein a diameter of the intermediate gear is 3.2 times a diameter of the first spur gear, and
   wherein a diameter of the trailing gear is 3.2 times a diameter of the second spur gear.

5. The assembly of claim 1, wherein the leading gear, the first compound gear, and the second compound gear make up a gear train comprising a gear ratio of 13.3:1.

6. A filament feed monitor assembly for a 3D printer, comprising:
   a feed roller rotatable about a first axis;
   a leading gear coupled to the feed roller such that the feed roller and the leading gear rotate together at a first speed;
   an intermediate gear rotatable about a second axis;
   a first spur gear coupled to the intermediate gear such that the first spur gear and the intermediate gear rotate together at a second speed, the first spur gear is meshed with the leading gear such that the first spur gear and the leading gear rotate in opposite directions;
   a trailing gear rotatable about the first axis;
   a second spur gear coupled to the trailing gear such that the second spur gear and the trailing gear rotate together at a third speed, the second spur gear is meshed with the intermediate gear such that the second spur gear and the intermediate gear rotate in opposite directions and the leading gear and the trailing gear rotate in the same direction; and
   an optical motion sensor electrically coupled to an optical error detection controller and used to detect the third speed of the trailing gear.

7. The assembly of claim 6, further comprising:
   a drive motor controlled by a drive controller based on input received from the optical error detection controller.

8. The assembly of claim 6, further comprising:
   a housing in which the optical motion sensor is secured, wherein both the first axis and the second axis perpendicularly extend from the housing in a direction parallel to a sensing direction of the optical motion sensor.

9. The assembly of claim 6,
   wherein a diameter of the leading gear is 1.3 times a diameter of the feed roller,
   wherein a diameter of the intermediate gear is 3.2 times a diameter of the first spur gear, and
   wherein a diameter of the trailing gear is 3.2 times a diameter of the second spur gear.

10. The assembly of claim 6, wherein the leading gear, the intermediate gear, the first spur gear, the second spur gear and the trailing gear make up a gear train comprising a gear ratio of 13.3:1.

* * * * *